March 8, 1966 C. H. WIKLUND ET AL 3,238,842

TRANSPARENCY HOLDER WITH SLIDING SOUND TAPE

Filed June 14, 1962 6 Sheets-Sheet 1

INVENTORS
CARL H. WIKLUND
TORULF F. AASEN
HENRY J. WALTER

BY

ATTORNEY

March 8, 1966 C. H. WIKLUND ET AL 3,238,842

TRANSPARENCY HOLDER WITH SLIDING SOUND TAPE

Filed June 14, 1962

6 Sheets-Sheet 2

INVENTORS
CARL H. WIKLUND
TORULF F. AASEN
HENRY J. WALTER

BY Norman N. Holland

ATTORNEY

TRANSPARENCY HOLDER WITH SLIDING SOUND TAPE

Filed June 14, 1962

INVENTORS
CARL H. WIKLUND
TORULF F. AASEN
HENRY J. WALTER
BY
ATTORNEY

INVENTORS
CARL H. WIKLUND
TORULF F. AASEN
HENRY J. WALTER
BY Norman ... Holland
ATTORNEY

TRANSPARENCY HOLDER WITH SLIDING SOUND TAPE

Filed June 14, 1962 6 Sheets-Sheet 5

INVENTORS
CARL H. WIKLUND
TORULF F. AASEN
HENRY J. WALTER
BY [signature]
ATTORNEY INVENTORS
CARL H. WIKLUND
TORULF F. AASEN
HENRY J. WALTER
BY
Norris & Holland
ATTORNEYS United States Patent Office
3,238,842
Patented Mar. 8, 1966

3,238,842
TRANSPARENCY HOLDER WITH SLIDING SOUND TAPE

Carl H. Wiklund, New Rochelle, Torulf F. Aasen, Little Neck, and Henry J. Walter, Bethpage, N.Y., assignors to Airequipt, Inc., a corporation of New York Filed June 14, 1962, Ser. No. 202,451
9 Claims. (Cl. 88—28)

The present invention relates to a compact, easily handled, damage resistant and inexpensive recording means.

Such a means for recording sound signals or other signals or information which can be converted into electrical signals is desirable in many uses where presently known recording means are unsuitable or impractical. Such a recording means is particularly useful in synchronized systems combining two or more signal recordings or combining such a recording with another record such as a related photographic transparency or a punch card record. Such a recording is also extremely useful where it is necessary to store the recorded information for automatic selection and play-back.

One example of the use of such a recording is a combined sound recording and photographic slide such as the well known colored transparencies which are normally exhibited in slide projectors. The desirability of combining a sound recording and a photographic slide has let to the use of several systems for providing such dual recordings. Systems using separate phonograph records or magnetic tapes have been used but have been impractical for most uses since storage of the separate recordings and slides and the subsequent reassembly and synchronization of a particular recording with a particular slide has been difficult and complicated. Systems combining the transparencies and the recordings in a single frame have been delicate or cumbersome. In order to make a combined photographic and sound recording system practical and simple to use, there must be a rugged and compact means of storing the combination and of thereafter selecting, editing and exhibiting the combination in a simple foolproof manner.

The present invention solves this problem by providing a recording means for the sound signal which may be incorporated directly into a relatively simple slide transparency holding frame. Such a frame has the sound recording on one portion and the colored transparency or other record such as another sound record, a punch card, or a key code contained on another portion. This permits the storage, selection, editing and exhibition of the sound signal and the related information to be handled as a unit and thereby simplifies the problem of synchronization of the sound signal and the picture or other information. Recorded information other than sound and photographic may be similarly handled.

The improved signal recordings are easily stored and exhibited in magazines in a manner basically as simple as the present systems for regular photographic slides.

Accordingly, an object of the present invention is to provide an improved recording means.

Another object of the present invention is to provide an improved signal recording means adapted for being included as an integral part of a mounting including additional recorded information.

Another object of the present invention is to provide an improved means for synchronizing the exhibition of pictures and related sound recordings.

Another object of the present invention is to provide a combined pictorial and sound recording adapted for being stored and exhibited in magazines.

Another object of the present invention to provide an improved means for combining sound recordings with additional information records.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 9 is a schematic diagram of one embodiment of the pick-up control system;

Figures 1, 2, 3, 4:
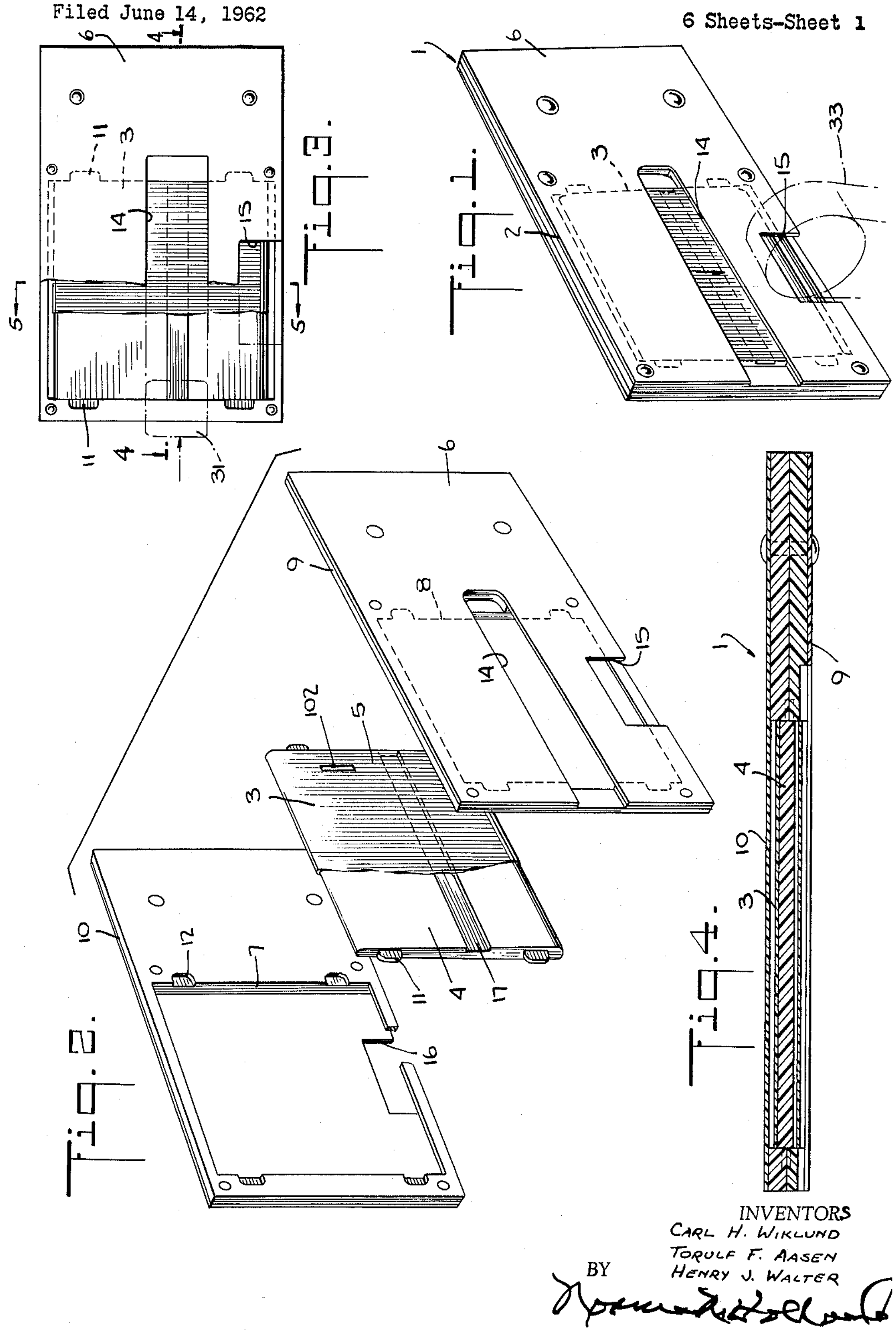
FIG. 1 is a perspective view of a preferred embodiment of the sound recording means in accordance with the present invention.
FIG. 2 is an exploded perspective view of the recording means of FIG. 1.
FIG. 3 is a front elevational view partially cut away of the recording means of FIG. 1.
FIG. 4 is a horizontal sectional view of the recording means taken along line 4—4 of FIG. 3.

The preferred embodiment of the recording means is illustrated in FIGS. 1–5. The recording means 1 comprises a generally planar frame 2 within which is mounted a loop of flexible recording tape 3. The tape loop 3 preferably is a magnetic recording tape formed of the well known magnetic recording material in which magnetic particles are embedded in or applied to the surface of flexible plastic. The loop 3 is mounted for travel around a suitable hub 4 which guides the forward surface 5 of the loop 3 for presentation to a suitable recording and pick-up head. The frame 2 illustrated in FIGS. 1–5 has an extended end portion 6. This portion is provided for a second recording medium as will be more fully described below. For example, an aperture may be provided in portion 6 to mount a film transparency or this portion may be used for punched holes such as are used in a data processing system.

While the preferred embodiment of the loop 3 is magnetic tape, the loop may also be used with other known recording methods such as cut grooves or an embossed recording. The recording may be a stereo recording either using a single groove in the conventional manner or two separate generally parallel signal tracks may be recorded on a single loop to provide a dual or stereo recording.

The preferred embodiment of the hub 4 comprises a separate element mounted in a suitable cavity provided by the matched openings 7 and 8 in the front and rear portions 9 and 10 respectively of the frame 2. The hub 4 is mounted within this cavity by mounting tabs 11 adapted to engage complementary slots in the frame 2. Access to the loop of tape 3 is provided for the magnetic or needle pick-up by the slot 14 formed in the front portion 9 of the frame 2. During recording or playback, the head moves continuously along the slot as the loop 3 is driven around the hub 4 to form a continuous recording track. Additional access for a driving means for the loop 3 is provided by the adjacent openings 15 and 16 provided at the bottom of the front and rear portions 9 and 10 of the frame. These openings permit the entrance of suitable drive belts, wheels or sprockets to turn the loop 3 on the hub 4 during recording or playback. In order to facilitate contact between the loop 3 and the recording or pick-up head by providing a gentle cushioned engagement, an elongated slot 17 is provided across the forward face of the hub 4 as best illustrated in FIGS. 2 and 5.

Figures 5, 10, 11, 12:
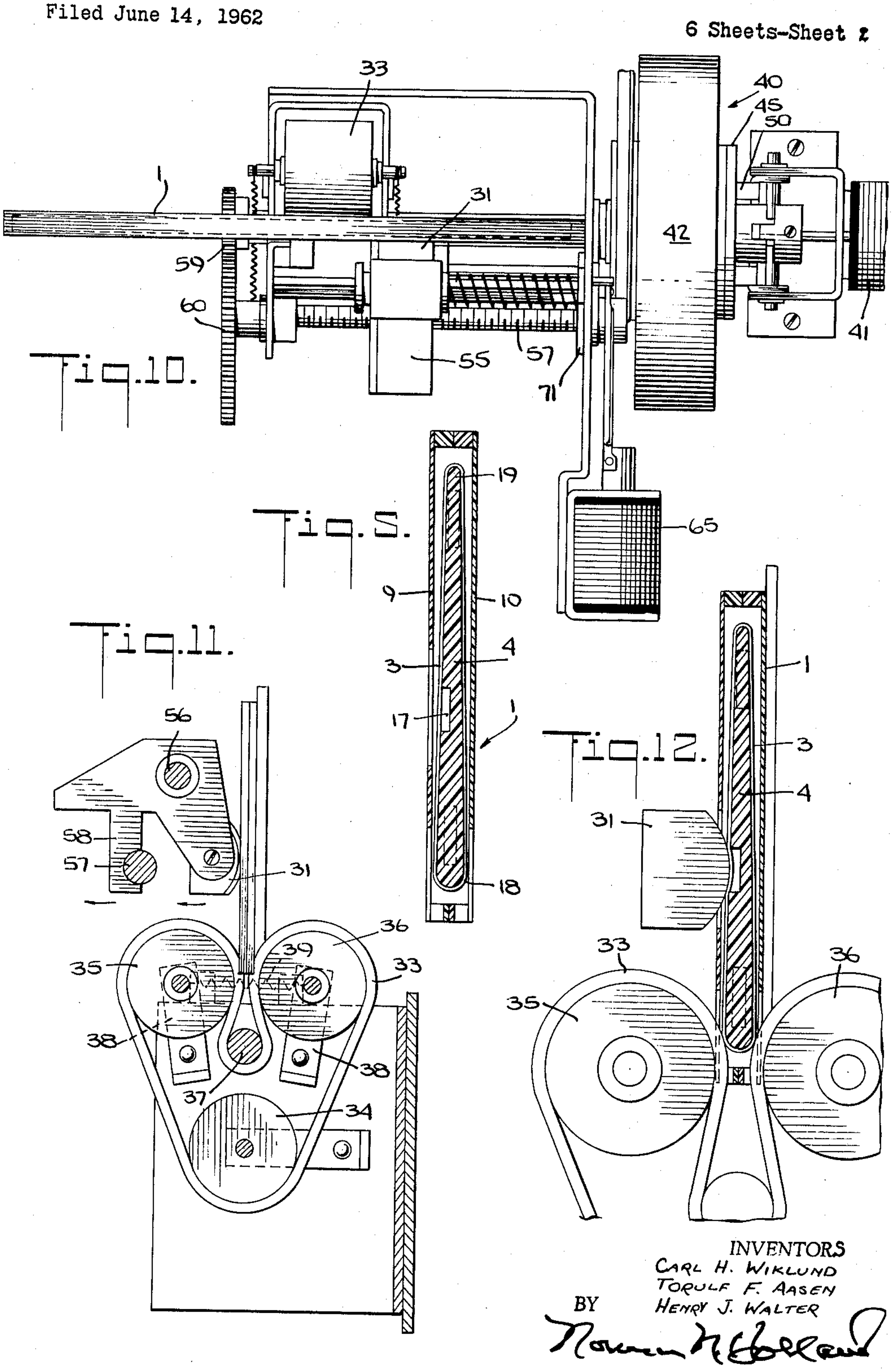
FIG. 5 is a vertical sectional view taken along line 5—5 of FIG. 3.
FIG. 10 is a top plan view of the pick-up of FIG. 6.
FIG. 11 is a side elevational view of a preferred embodiment of the recording drive means.
FIG. 12 is an enlarged detailed sectional view of the driving means of FIG. 11.

As illustrated in FIG. 5, the preferred cross-section of the hub 4 has a rounded or tapered lower edge 18 which acts as a bearing surface to facilitate the movement of the loop on the hub 4. The upper end 19 of the hub 4 is also tapered so that it has a relatively thin cross-section to provide for a satisfactory clearance between the loop 3 and the front and rear portions 9 and 10 of the frame 2. Since the preferred embodiment of the tape 3 as illustrated is driven on the hub 4 by a drive means gripping the lower portions of the loop 3, the upper portion of the loop will tend to ride more or less loosely on the upper end 19 of the hub 4. The hub 4 is made of a suitably hard material having a smooth surface which permits easy sliding movement of the film loop 3. Both this member and the front and rear portions of the frame 2 are preferably molded from a suitable plastic which provides a smooth low friction finish one of which is sold under the trademark Teflon.

Figures 13, 14, 15, 16, 17, 18, 19, 20, 21:
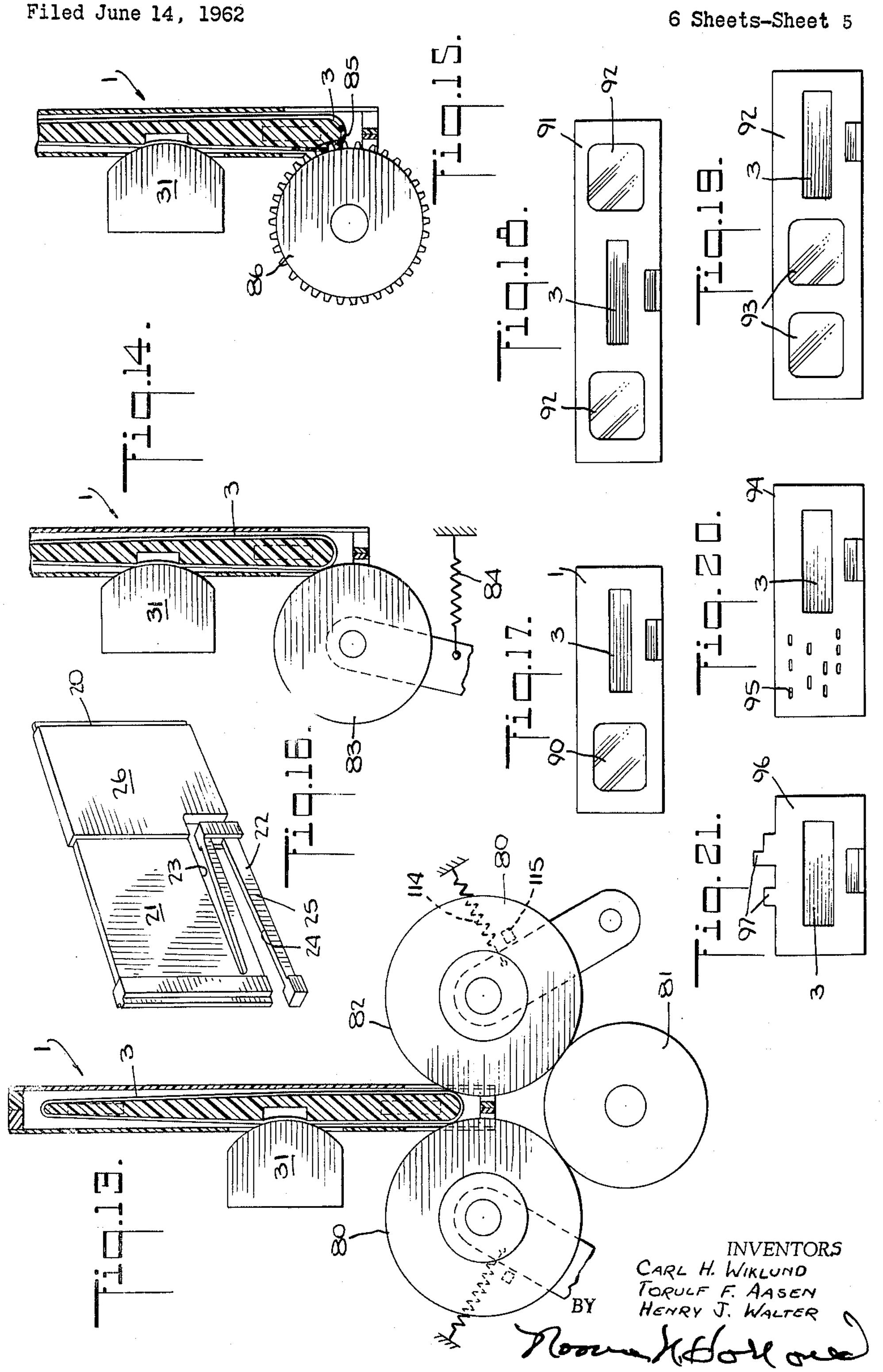
FIG. 13 is an enlarged detailed sectional view of another embodiment of the recording driving means.
FIGS. 14 and 15 are enlarged detailed sectional views of two further embodiments of the recording driving means.
FIG. 16 is a perspective view of another embodiment of the recording means.
FIGS. 17–21 are front elevational views each showing a different embodiment of a combined sound recording and another data recording means.

Another embodiment of a frame for supporting the loop of tape is illustrated at 20 in FIG. 16. In this embodiment, the frame 20 is formed in a single piece. The hub or mounting portion 21 for the loop of tape comprises an area of reduced height and thickness having a lower portion 22 resiliently attached by the provision of slots 23 and 24 which provide a resilient lower loop tightening surface 25. This frame 20 also has an extended end portion 26 suitable for the mounting of a transparency or for the recording of other information by punched holes or other key indicators.

The frame as described above provides a convenient unitary mounting for two related recordings such as an audio recording and a photographic slide or visual recording. The frames may be made in the same height and width as regular frames for color transparencies with a somewhat greater length so that they may be conveniently stored in a magazine such as the type now widely used for photographic slides or transparencies. The frames thus stored may be exhibited by the successive transfer of the frames by suitable automatic changers such as described in Patent Nos. 2,711,602, 2,837,851, or 2,915,840 or other slide changers.

A preferred embodiment of a pick-up means adapted to simultaneously play back the audio recording and to expose a transparent slide to a projector optical system is illustrated in FIGS. 6–12. In this pick-up means, the frame 1 is moved into suitably spaced support channels 30 by a transfer means such as those of the above patents. Channels 30 hold the frame 1 in proper position with respect to the pick-up head 31 and the other reproduction elements such as the optical system of a slide projector. When the frame is held in this position, the slots 16 and 17 in the frame 2 expose the lower portion of the loop 3 to a suitable drive means illustrated generally at 32.

One embodiment of the drive means is illustrated in FIG. 11. This drive means comprises an endless resilient belt 33 mounted on three spaced rollers 34–36 and a central drive shaft 37. The two upper rollers 35 and 36 hold the belt 33 in tight engagement with the loop 3 by being mounted at the upper ends of the pivoted mounting arms 38 which are drawn towards each other by the spring 39. Since the endless belt 33 is driven by its contact with the drive shaft 37, the surface speed of the belt at all points will be equal to the surface speed of the drive shaft 37 and this speed will be directly transmitted to the loop 3 permitting a constant and predetermined surface speed to be maintained on the rotating loop 3. The drive shaft 37 is started and stopped at the proper times by the operation of a clutch 40 (FIG. 6) mounted on the end of the drive shaft 37. The clutch 40 is operated by the electric solenoid 41 under the control of the drive switch 72 (FIG. 9).

The clutch 40 comprises a continuously rotating disc 42 mounted on bearing 43 and driven by a suitable motor coupled thereto by drive belt 44. The disc 42 is detachably coupled to the drive shaft 37 by means of the clutch plate 45 engaging the disc 42 through the friction disc 46. The clutch plate 45 is splined to drive shaft 37 so that it rotates with it while it is free to slide longitudinally along the shaft. The plate 45 is held out of engagement with disc 42 and against stop 47 by the coiled spring 48 and when the control solenoid 41 is energized, its armature 49 rotates the clutch arm 50 in a counterclockwise direction so that it forces the clutch plate 45 against the rotating disc 40 causing the drive shaft 37 to turn with disc 40. The drive shaft 37 therefore continuously rotates whenever the control solenoid 41 is energized and the loops 3 are driven as long as the frames 1 are in position for recording or playback in channels 30.

When the frame 1 is moved into play back or recording position in channels 30 with the tape loop 3 in engagement with the drive means 32, the pick-up head 31 is moved across the tape surface for either recording or reproducing the audio message. A mounting means for the pick-up head 31 to provide for its scanning motion across the loop 3 is illustrated in FIGS. 6–11, and 22–24.

Figure 6:
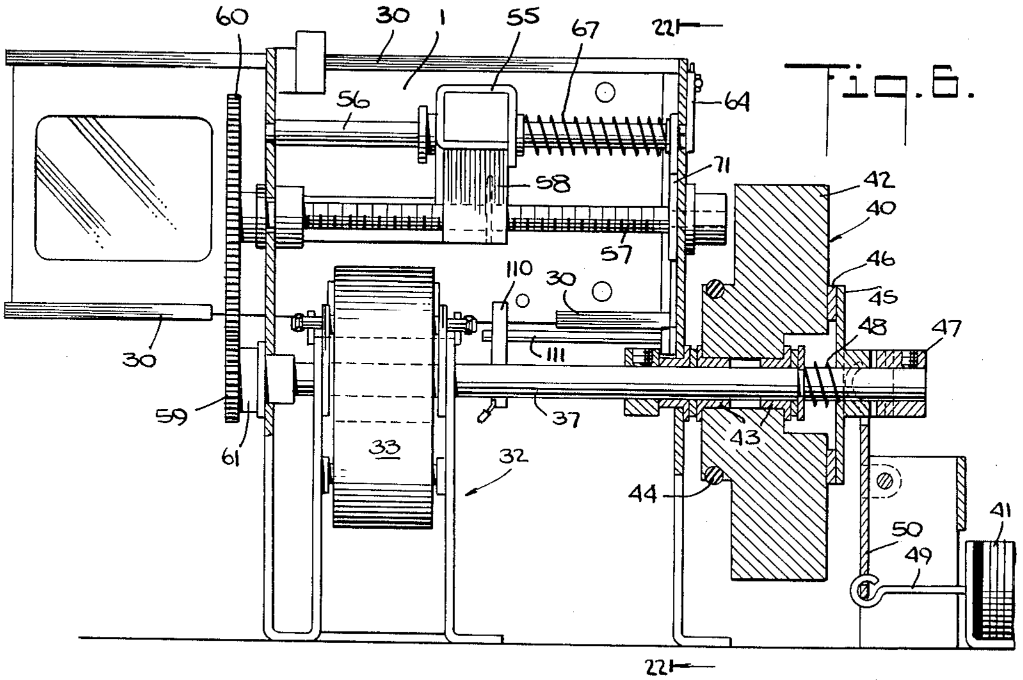
FIG. 6 is a front elevational view of a preferred embodiment of a sound pick-up means for use with the recording means of FIG. 1.
Figures 7, 8:
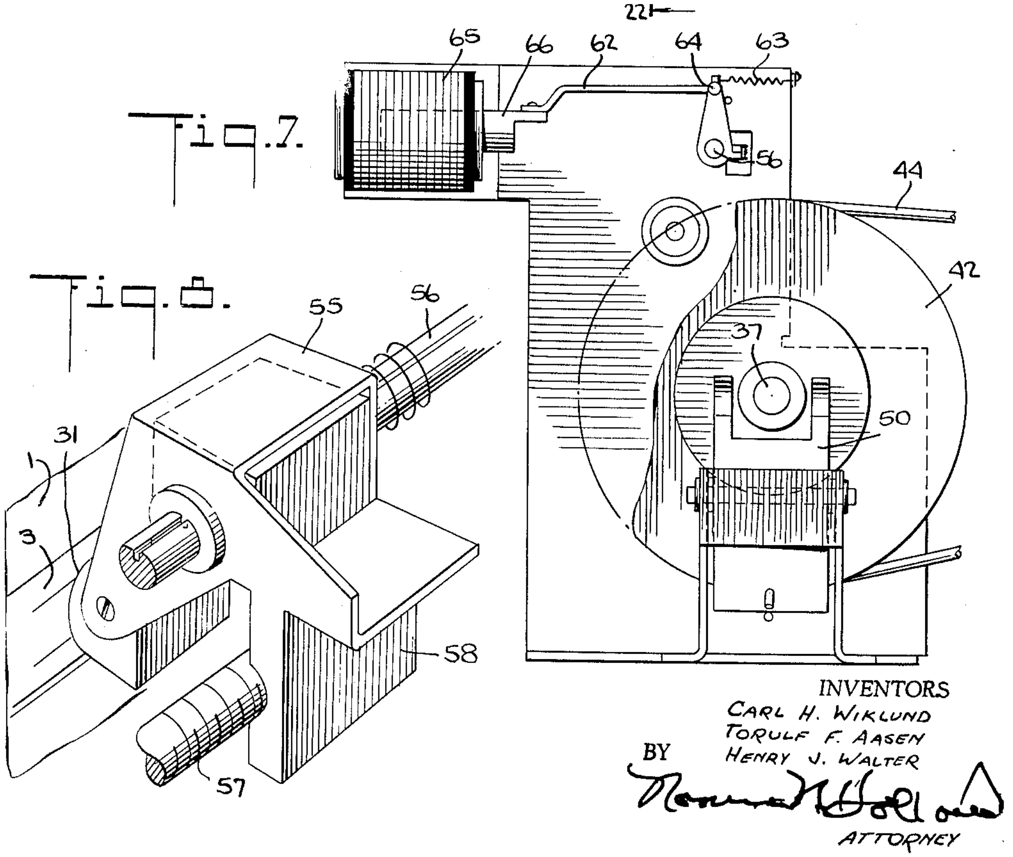
FIG. 7 is a side elevational view of the pick-up of FIG. 6.
FIG. 8 is an enlarged detailed perspective view of the pick-up head mounting for the pick-up of FIG. 6.
Figure 3:
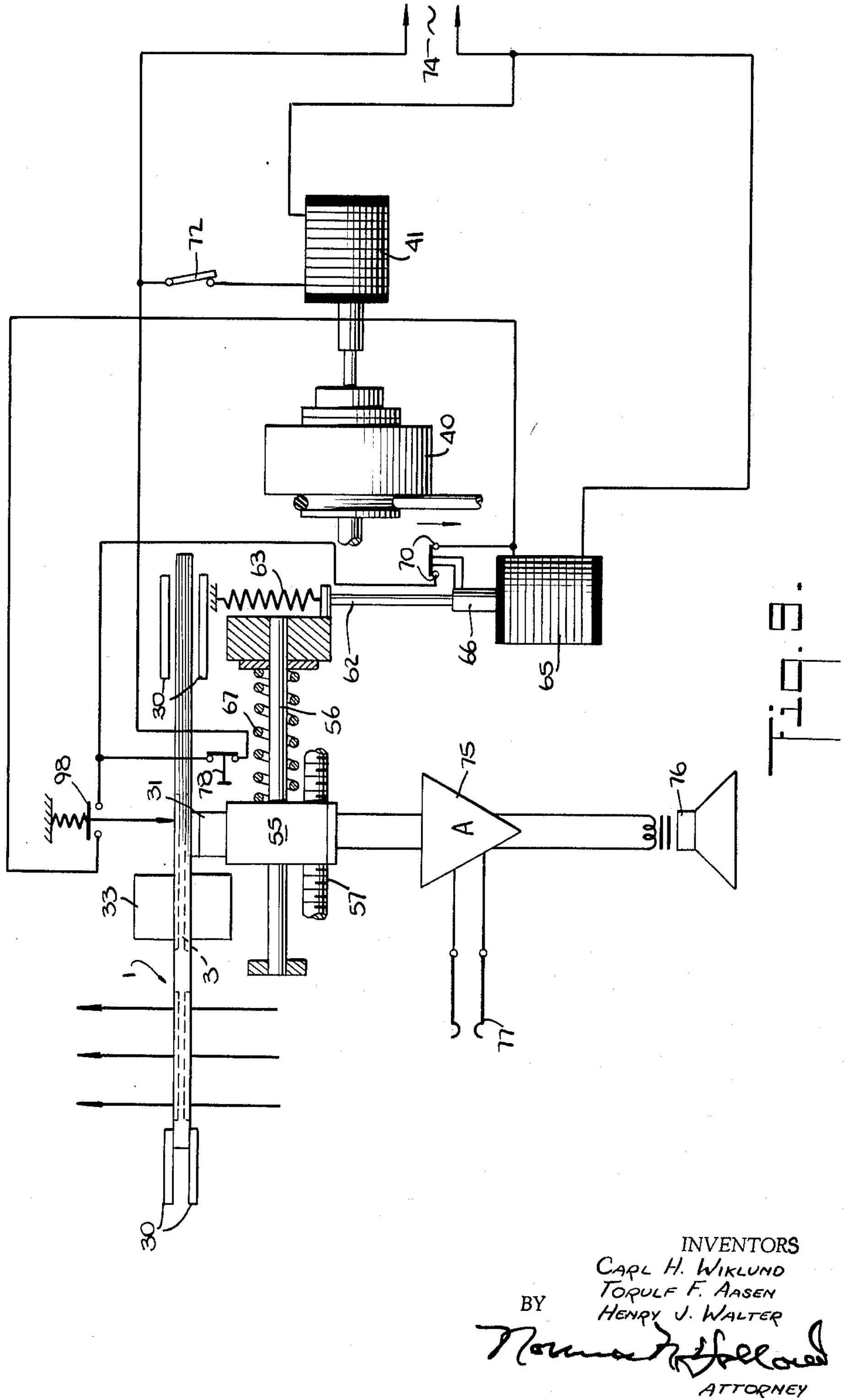

A magnetic pick-up head 31 is illustrated in FIGS. 6 and 8 mounted on a support arm 55. The support arm 55 is slidably mounted in splined relationship on an elongated support rod 56 adapted to permit sliding motion of the arm and head across the face of the loop 3 mounted in the frame. The splined connection causes the support arm 55 to rotate with the support rod 56 to engage and disengage the head 31 from the loop 3 as will be more fully described below. In order to control the scanning movement of the pick-up 31 across the loop 3, the arm 55 is removably coupled to a rotating lead screw 57 by means of a split nut 58.

The lead screw 57 is coupled to the drive shaft 37 through gears 59 and 60 and a friction clutch 61 so that the lead screw 57 rotates with the drive shaft 37 is normal operation. The friction clutch 61 which is included in this connection is used in a lead screw indexing system which will be described in connection with the following description of a complete scanning cycle of the pick-up head 31.

At the beginning of a pick-up cycle, the pick-up head 31 is swung on the support rod 56 into engagement with the loop 3 in a frame 1. This movement of the pick-up head 31 to the pick-up position is accomplished through the energizing of the pick-up control solenoid 65 whose armature 66 rotates the support rod 56 to the pick-up position through the intermediation of the connecting rod 62 and crank 64 which is fixedly attached to the end of the rod 56.

The control solenoid 65 is automatically energized by the entry of a frame 1 into channels 30 in the following way. Each loop 3 has a control slot 102 formed therein. When the frame 1 is in play-back position, the end 103 (FIG. 22) of the switch arm for switch 98 enters this slot 102 thereby momentarily closing switch 98 to connect the solenoid 65 across the current source 74. This energizes the solenoid 65 moving its armature 66 to rotate crank arm 64 and to close the holding contacts 70 which cause the solenoid 65 to remain energized after the switch 98 is thereafter opened. The solenoid 65 will now remain energized causing the support arm 55 to be moved across the surface of the loop 3 by the lead screw 57 until the support 55 strikes the contact arm for switch 78. When this occurs, switch 78 opens thereby deenergizing the solenoid 65 so that the solenoid armature 66 is returned through the force of coil spring 63 to its initial position with the pick-up head 31 swung clear of the loop 3 by the support rod 56. When this occurs, compressed coil spring 67 on the support rod 56 automatically returns the support arm 55 to its starting position for its next cycle. The switch 78 may also be opened manually if desired to terminate the pick-up action and to return the pick-up head 31 to its starting position whenever desired by the operator.

Figures 22, 23, 24:
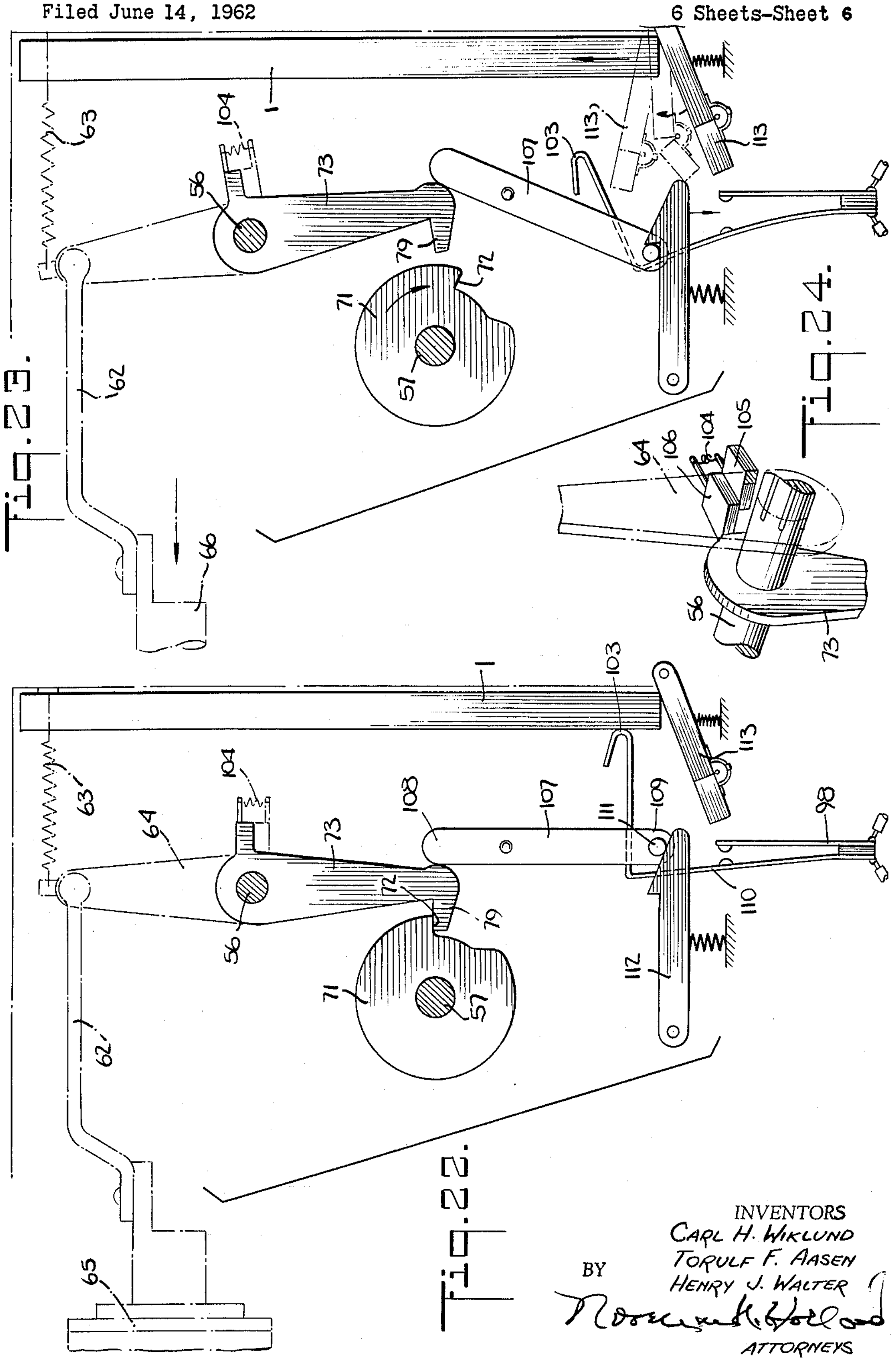
FIGS. 22 and 23 are enlarged detailed elevational views of the lead screw indexing means and the slide switch control.
FIG. 24 is a fragmentary detailed perspective view of the lead screw indexing means.

In order to insure proper tracking of the pick-up head 31 for each frame, an indexing means is provided to insure that the lead screw 57 is always stopped at the same position preparatory to the commence of a new cycle. A preferred embodiment of the indexing means is illustrated in FIGS. 22–24. As seen in these figures, a brake wheel 71 is mounted on the lead screw 57 having a braking notch 72 at its outer edge. When the solenoid 65 is de-energized to return the pick-up head 31 to its starting position, the above described clockwise rotation (FIGS. 22 and 23) of the support rod 56 swings a braking arm 73 against the braking wheel 71 so that it slips into the notch 72 when the notch turns to a position opposite the braking arm tooth 79. This stops rotation of the lead screw 57 by locking it in position so that the friction clutch 61 slips thereby disconnecting the lead screw 57 from the rotating drive shaft 37 until the lead screw is again released by the withdrawal of the braking arm 73.

The braking arm 73 is rotatably mounted on the support rod 56 and is coupled for clockwise rotation therewith by being connected to the crank arm 64 through a spring 104. Clockwise rotation of the crank 64 tends to stretch the spring 104 to urge the tooth 79 of the braking arm 73 against the braking wheel 71 so that the tooth 79 will slip into the braking notch 72 when it turns to a position adjacent the tooth 79.

When the solenoid 65 is again energized to start the next cycle, it again turns the crank 64 in a counterclockwise direction to move the pick-up head 31 against loop 3. When this occurs, a stop member 105 (FIG. 24) on the crank 64 engages a stop member 106 on the braking arm 73 thereby rocking the braking arm 73 out of engagement with the braking wheel 71 as shown in FIG. 23 so that the lead screw 57 again rotates in synchronism with drive shaft 37.

In order to prevent closing of the switch 98 when a frame 1 is withdrawn from the channels 30 and to reduce wear on the contact point 103, a control switch de-activating means is preferably included as is also illustrated in FIGS. 22 and 23. This system is associated with the braking arm 73 and it includes a lever 107 pivotally mounted with its upper end 108 engaging the braking arm 73 and with its lower end 109 positioned for engaging the spring-like contact 110 of the switch 98 through the intermediation of a rod 111 (FIG. 6). When the braking arm 73 is swung in its counterclockwise direction (FIG. 22), after the initial closing of switch 98 at the beginning of a cycle as described above, this movement of the braking arm 73 rotates the lever 107 in a clockwise direction causing its connected rod 111 to swing to the position illustrated in FIG. 23 to hold the switch 98 open. The lever is held in this position by a latch 112 so that switch 98 cannot be again closed until the latch 112 is lowered to release the lever. The release of the latch 112 is performed by the entry of the next successive frame 1 which lowers latch release arm 113 so that it frees the lever 107 from latch 112 by temporarily lowering latch 112. This permits switch 98 to return to the position illustrated in FIG. 22 with its contact point 103 engaging loop 3 in frame 1 and ready to enter slot 102 to start the scanning cycle.

The latch release arm 113 has its end portion pivotally mounted for counterclockwise rotation only to permit the release arm to clear the latch 112 on its upward movement as the frame 1 is withdrawn.

Additional embodiments of the drive means for a loop of tape 3 are illustrated in FIGS. 13–15. FIG. 13 illustrates two drive rollers 80 engaging spaced portions of the loop 3. These rollers 80 are driven by a drive roller 81 which turns the drive surfaces 82 of the rollers 80 at a constant predetermined speed. The two engaging rollers 80 are resiliently mounted to permit the frame 1 to be slipped into engaging position between the rollers 80 as illustrated in FIG. 13. In the absence of a frame 1, the springs 114 hold the drive rollers 80 against stops 115 and out of engagement with drive roller 81 to minimize roller wear. The engagement of the rollers 80 by a frame 1 forces the rollers 80 into engagement with drive roller 81.

FIG. 14 illustrates a single drive roller 83 urged into engagement with the loop 3 by a suitable spring 84.

FIG. 15 illustrates a further embodiment of the loop drive wherein sprocket holes 85 are provided in the loop 3. These sprocket holes 85 are positioned to be engaged by a suitable drive sprocket 86 when the frame 1 has been moved into the play-back or recording position.

As more fully discussed above, the above described compact and simple audio recording is adapted for being included in a variety of frames having additional information recorded on a spaced portion of the frame.

FIG. 17 illustrates a frame 1 having the loop 3 mounted as described above at one end and having a transparent photographic slide 90 suitably framed on the opposite end.

FIG. 18 illustrates a loop 3 mounted at the central portion of a frame 91 which has a pair of spaced transparencies 92 mounted at the opposite ends for use in a stereo-type projector.

FIG. 19 illustrates another embodiment of a stereo slide 92 having a loop of tape 3 at one end and a pair of transparencies 93 at the opposite end.

FIG. 20 illustrates a frame 94 having the loop of tape 3 at one end and additional information recorded thereon by a suitable punch system having perforations 95.

FIG. 21 illustrates a frame 96 having the audio information recorded on the loop of tape 3 on the central portion and an additional key coding provided on the frame 96 by the teeth 97 cut on the upper portion of the frame.

As illustrated in FIG. 9, the signal from loop 3 is fed through a suitable amplifier 75 to a speaker 76. A microphone jack 77 is provided for amplifier 75 to permit the recording of a message on the loop 3 when the pick-up means is being used for a recording operation.

It will be seen that an extremely compact and convenient signal recording means has been provided which is ideally suited for magazine storage and automatic handling. The recording means is also adapted for combination with other recording means such as transparent slides, punch cards, etc. This permits, for example, an audio recording to be combined with a slide or with other information and the combination to be handled as a unit in a pick-up means which automatically synchronizes the playback of the recording with the exhibition or reading of the other information recorded on the same frame member.

This novel signal recording therefore provides an extremely practical means for the automatic handling and magazine storge of recorded signals alone or in combination with other recordings, transparencies, punch cards, key card programs or the like.

As various changes may be made in the form, construction and arrangement of the parts herein without departing from the spirit and scope of the invention claimed and without sacrificing any of its advantages, it is to be understood that all matter herein is to be interpreted as illustrative and not in a limiting sense.

Having thus described our invention, we claim:

1. A recording means comprising a generally planar support having a front portion and a rear portion, a recess in one face of each of said portions cooperating to form a cavity, a hub removably mounted in said cavity having a pair of generally parallel and spaced bearing surfaces, a flexible loop of recording tape mounted on said hub with spaced portions slidably engaging said bearing surfaces, and an aperture in one of said portions communicating with said cavity to expose a portion of said recording tape.

2. The means as claimed in claim 1 in which said recording tape comprises a magnetic recording tape.

3. A recording means comprising a generally planar support having a front portion and a rear portion, a recess in one face of each of said portions cooperating in form a cavity, a hub removably mounted in said cavity having a pair of generally parallel and spaced bearing surfaces, a recording means comprising a flexible loop of recording tape mounted on said hub with spaced portions slidably engaging said bearing surfaces, an aperture in one of said portions communicating with said cavity to expose a portion of said recording tape, and a photographic transparency mounted on said support.

4. The recording means as claimed in claim 3 in which said recording tape is a magnetic tape.

5. A sound track carrier comprising a generally planar support having a front portion and a rear portion, a recess in one face of each of said portions cooperating to form a cavity, a hub removably mounted in said cavity having a pair of generally parallel and spaced bearing surfaces, a flexible loop of recording tape mounted on said hub with spaced portions slidably engaging said bearing surfaces, an aperture in one of said portions communicating with said cavity to expose a portion of said recording tape intermediate said bearing surfaces, and a second aperture in one of said portions communicating with said cavity to expose a portion of said recording tape adjacent one of said bearing surfaces.

6. A sound track carrier comprising a plate-like body of generally rectangular shape, said body having a portion of reduced width and thickness including two opposite parallel edges, a flexible endless loop of recording tape disposed around said two opposite parallel edges of said portion of reduced width and thickness and being slidable around said edges, and an elongated open ended slot extending into said body generally parallel to one of said edges whereby the portion of said body between slot and said one edge forms a resilient tensioning means for said tape.

7. The carrier as claimed in claim 6 in which said recording tape comprises a magnetic recording tape.

8. The carrier as claimed in claim which further comprises a photographic transparency mounted on said body.

9. A sound-slide holder comprising the combination of a generally rectangular planar frame, a film transparency mounted in an aperture in said frame, a magnetic tape slidably mounted on the frame comprising a single loop encircling a portion of said frame spaced from the edges of the aperture and having two elongated parallel flat runs connecting curved end portions, the two elongated runs of the tape being generally parallel to the plane of the frame and being in sliding engagement with surfaces thereof.

References Cited by the Examiner

UNITED STATES PATENTS

| | | | |
|---|---|---|---|
| 2,520,410 | 8/1950 | Jelinek | 352—1260 X |
| 2,899,507 | 8/1959 | Martel | 179—100.2 |
| 2,961,922 | 11/1960 | Schwartz et al. | 88—28 |
| 3,057,255 | 10/1961 | Eash | 179—100.2 |
| 3,057,255 | 10/1962 | Bregman | 88—28 |
| 3,063,338 | 11/1962 | Bregman | 88—28 |
| 3,176,580 | 4/1965 | Metz | 88—28 |

FOREIGN PATENTS

| | | |
|---|---|---|
| 569,592 | 11/1957 | Italy. |

NORTON ANSHER, *Primary Examiner.*

WILLIAM MISIEK, *Examiner.*